(12) United States Patent
Thiele et al.

(10) Patent No.: US 8,527,957 B2
(45) Date of Patent: Sep. 3, 2013

(54) SOFTWARE TESTING TO VALIDATE TENANT OPERATIONS

(75) Inventors: Christopher Thiele, Nussloch (DE); Markus Schierle, Bad Rappenau (DE); Joachim Altmeyer, Leimen (DE); Matthias Becker, Weisenheim/Sand (DE); Vitor Eduardo Seifert Bazzo, St. Leon-Rot (DE)

(73) Assignee: SAP AG, Walldorf (DE)

( * ) Notice: Subject to any disclaimer, the term of this patent is extended or adjusted under 35 U.S.C. 154(b) by 289 days.

(21) Appl. No.: 12/940,373

(22) Filed: Nov. 5, 2010

(65) Prior Publication Data

US 2012/0116849 A1    May 10, 2012

(51) Int. Cl.
```
G06F 9/44      (2006.01)
G06F 21/00     (2013.01)
G06F 17/00     (2006.01)
G06F 17/30     (2006.01)
G06F 13/00     (2006.01)
G06F 3/048     (2006.01)
G06Q 50/00     (2012.01)
```
(52) U.S. Cl.
USPC ............. 717/127; 705/314; 705/51; 707/625; 707/655; 707/809; 711/173; 715/769

(58) Field of Classification Search
None
See application file for complete search history.

(56) References Cited

U.S. PATENT DOCUMENTS

| | | | |
|---|---|---|---|
| 7,174,301 B2 * | 2/2007 | Florance et al. | 705/313 |
| 7,254,559 B2 * | 8/2007 | Florance et al. | 705/51 |
| 7,467,092 B2 * | 12/2008 | Anderson et al. | 705/314 |
| 7,921,299 B1 * | 4/2011 | Anantha et al. | 705/51 |
| 7,933,869 B2 * | 4/2011 | Becker et al. | 707/625 |
| 2008/0209503 A1 * | 8/2008 | Hess et al. | 717/178 |
| 2009/0049056 A1 * | 2/2009 | Shutt et al. | 707/10 |
| 2009/0106041 A1 * | 4/2009 | Anderson et al. | 705/1 |
| 2009/0198660 A1 * | 8/2009 | Kottomtharayil | 707/3 |
| 2009/0240565 A1 * | 9/2009 | Calonge | 705/10 |
| 2010/0030995 A1 * | 2/2010 | Wang et al. | 711/173 |
| 2010/0077449 A1 * | 3/2010 | Kwok et al. | 726/3 |
| 2010/0088636 A1 * | 4/2010 | Yerkes et al. | 715/769 |
| 2010/0211548 A1 * | 8/2010 | Ott et al. | 707/655 |
| 2010/0262632 A1 * | 10/2010 | Jain et al. | 707/809 |

OTHER PUBLICATIONS

Afkham Azeez et al., Multi-Tenant SOA Middleware for Cloud Computing, Jul. 2010, [Retrieved on Apr. 3, 2013]. Retrieved from the internet: <URL: http://ieeexplore.ieee.org/stamp/stamp.jsp?tp=&arnumber=5557959> 8 Pages (458-465).*

Cor-Paul Bezemer et al., Enabling Multi-Tenancy: An Industrial Experience Report, IEEE 2010, [Retrieved on Apr. 3, 2013]. Retrieved from the internet: <URL: http://ieeexplore.ieee.org/stamp/stamp.jsp?tp=&arnumber=5609735> 8 Pages (1-8).*

* cited by examiner

*Primary Examiner* — Don Wong
*Assistant Examiner* — Anibal Rivera
(74) *Attorney, Agent, or Firm* — Mintz Levin Cohn Ferris Glovsky and Popeo, P.C.

(57) ABSTRACT

Systems, methods, computer program products, and the like for testing to validate software operations are described. A first part of a test can be executed in a tenant currently having a first system state. The tenant can be transitioned from the first system state to a second system state. The transitioning can have an unknown effect on a business process or business scenario running in the tenant. A second part of the test can be executed in the tenant while the tenant is in the second system state. Upon completion of the test, it can be determined whether the transition of the tenant from the first system state to the second system state negatively impacts the running of the business process or business scenario.

20 Claims, 7 Drawing Sheets

SOFTWARE TESTING TO VALIDATE TENANT OPERATIONS

TECHNICAL FIELD

The subject matter described herein relates to testing of business software to validate tenant operations.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a method includes executing a first part of a test in a tenant currently having a first system state. The tenant is transitioned from the first system state to a second system state, with the transitioning having an unknown effect on a business process or business scenario running in the tenant. A second part of the test is executed in the tenant while the tenant is in the second system state. Upon completion of the test, it is determined whether the transition of the tenant from the first system state to the second system state negatively impacts the running of the business process or business scenario.

In some variations one or more of the following can optionally be included. The transition can include at least one of a change, update, or modification to a system upon which the tenant is hosted. The first system state can include the system prior to the transition, and the second system can include the system subsequent to the transition. The transition can include a moving of the tenant from a first system upon which the tenant is hosted to a second system or a copying of the tenant to create a tenant copy hosted on the first system or on the second system, such that the first system state includes a first operating environment on the first system and the second system state includes a second operating environment on the second system. The tenant can be one of a plurality of tenants hosted in a multi-tenant system that includes an application server and a data repository. The application server can provide access for each of a plurality of organizations to one of the plurality of tenants. Each of the plurality of client tenants can include a customizable, organization-specific version of a core software platform. The data repository can include tenant-independent content that is common to all of the plurality of client tenants and tenant-specific content items whose tenant-specific content formats and tenant-specific content data are defined by and available to only one of the plurality of client tenants.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

It should be noted that, while the descriptions of specific implementations of the current subject matter discuss delivery of enterprise resource planning software to multiple organizations via a multi-tenant system, the current subject matter is applicable to other types of software and data services access as well as to systems in which a single tenant is hosted on a single system. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 1:
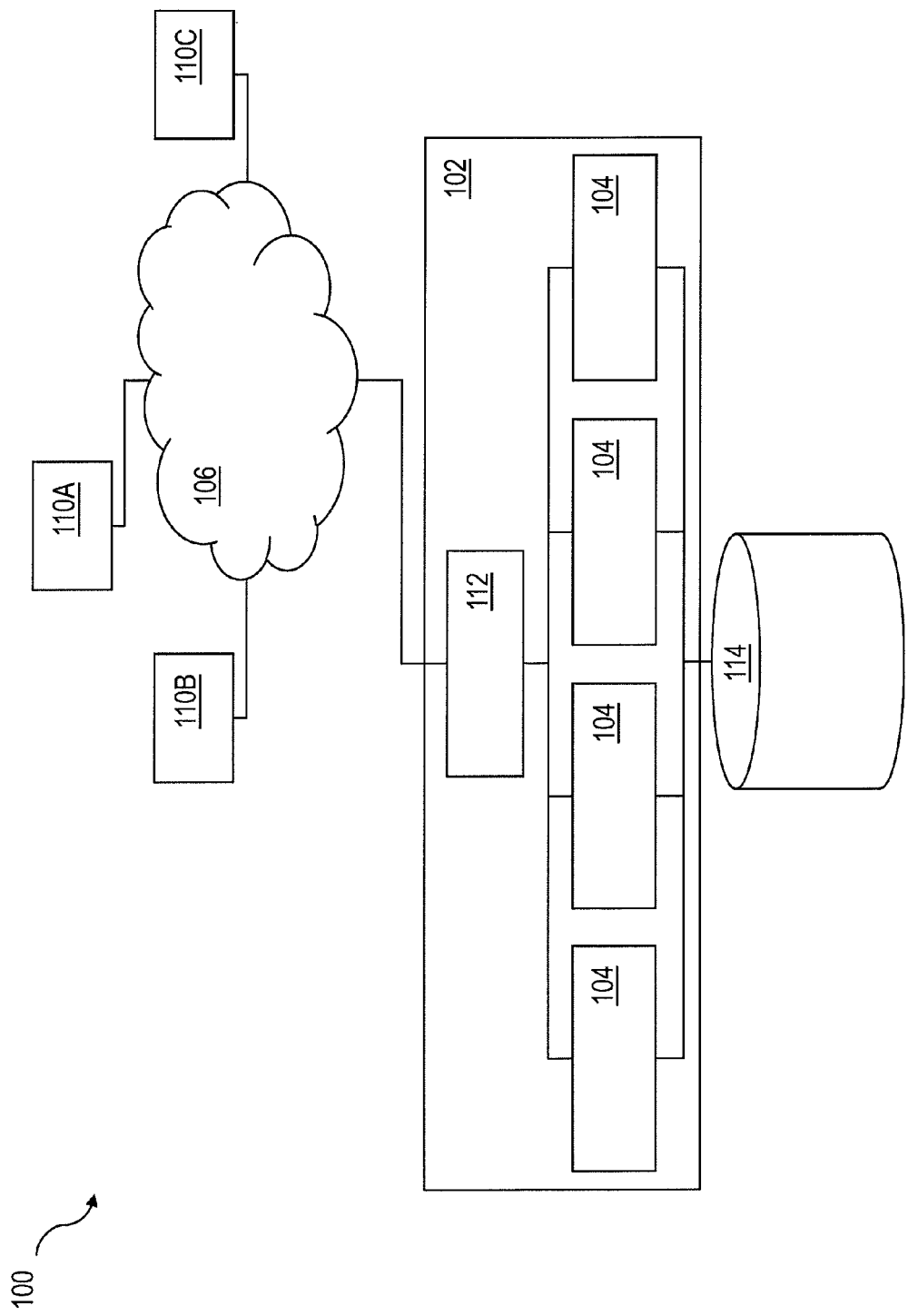
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
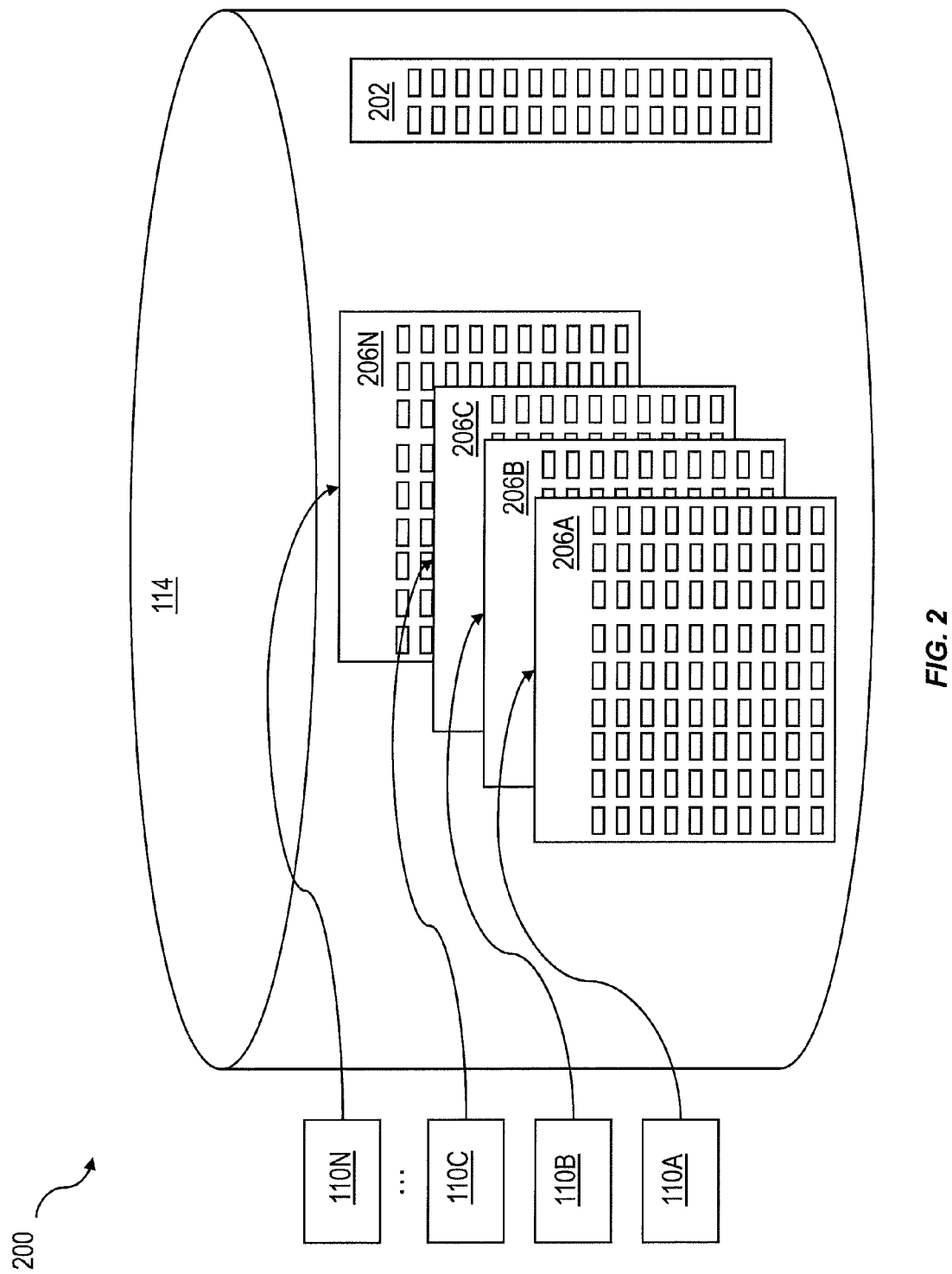
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform and system content 202, and tenant content 206. Core software platform and system content 202 can include data and meta-data content that represents core functionality and is not modifiable by a tenant. System content 202 can in some examples be created by the runtime of the core software platform and can include core data objects that are modifiable with data provided by each tenant. For example, if the core software platform is an ERP system that includes inventory tracking functionality, the system content 202 can include data objects for labeling and quantifying inventory. The data retained in these data objects are tenant-specific: for example, each tenant 110A-110N stores information about its own inventory. Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the core software platform and system content 202 and tenant content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

Such an approach can introduce several challenges. Making changes, updates, or modifications to the core software platform, for example updating to a new version, implementing a change to the core functionality, or the like, can become a complicated and unpredictable process if each tenant's customized data objects and other tenant-specific configurations do not react in the same manner to the modifications. Additionally, execution of a multi-tenancy operation, such as for example moving a tenant to a new server instance or to a new system, copying a tenant either to the same system or to a different system, or the like, can introduce uncertainty regarding whether business processes or business scenarios running in the original state of the tenant will be able to continue without disruption in the new state of the tenant.

To address these and potentially other issues with currently available solutions, one or more implementations of the current subject matter provide methods, systems, articles or manufacture, and the like that can, among other possible advantages, enable verification that a business process that is in progress on a first system can be successfully continued and finished on a second system or on the first system after an update or change to the first system.

Figure 3:
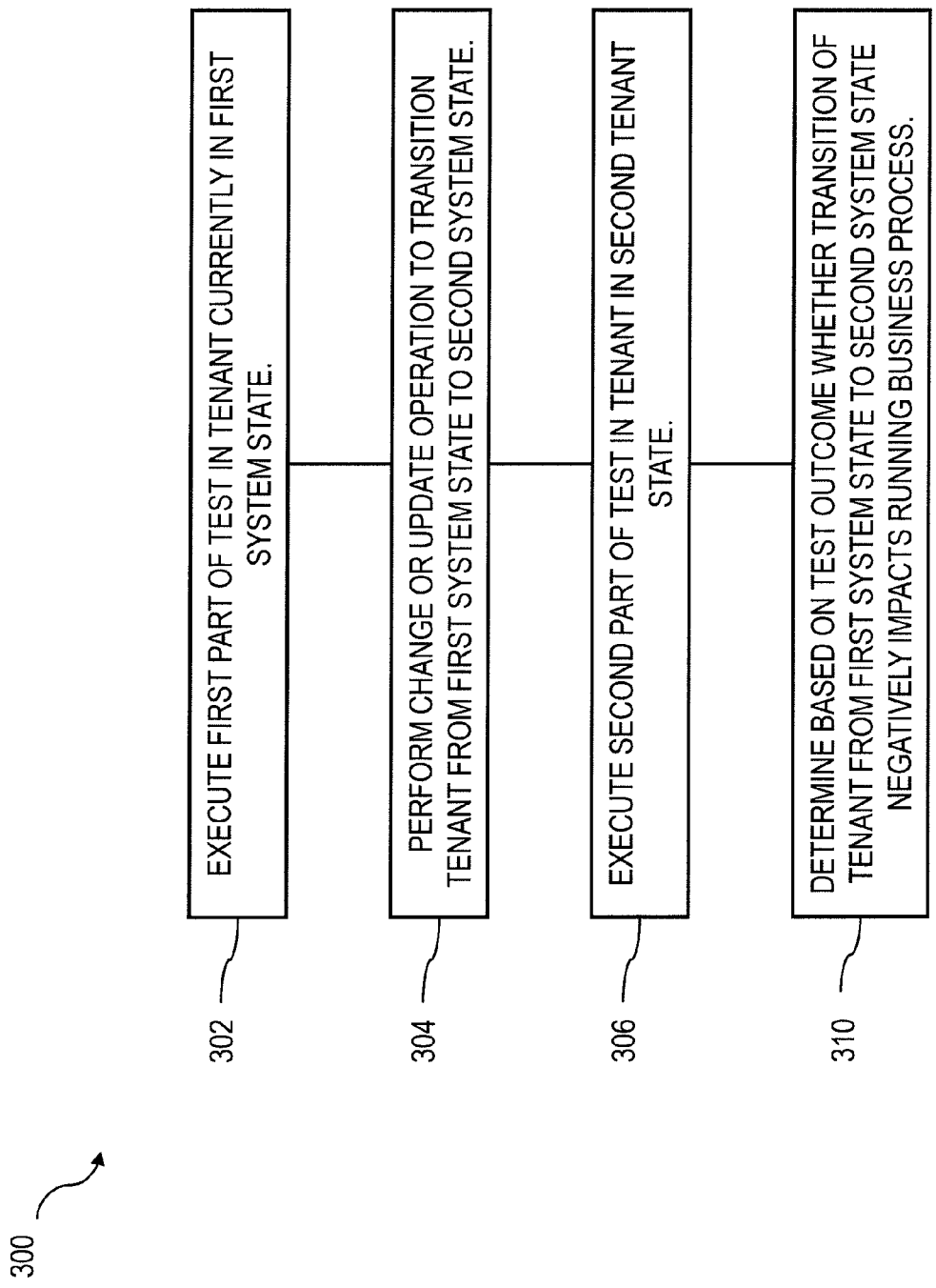
FIG. 3 is a process flow diagram illustrating aspects of a method consistent with implementations of the current subject matter.

In one implementation of the current subject matter, at least some features of which are illustrated in the concept flow chart 300 of FIG. 3, a method is provided for testing the influence of operations related to changes or updates in a multi-tenant software delivery architecture on business processes and scenarios. At 302, a first part of a test can be executed in a tenant that is currently in a first system state. At 304, a change or update operation can be performed that transitions the tenant from the first system state to a second system state. This transition can include a change, update, or modification to the system upon which the tenant is hosted and/or a move, copy, or the like of the tenant to a new system from its original system, etc. At 306, a second part of the test can be executed in the tenant while the tenant is in the second system state. Upon completion of the test, a determination can be made at 310 whether the transition of the tenant from the first system state to the second system state negatively impacts a business process or scenario running in the first tenant.

In the case of the transition from the first system state to the second system state including a transfer of the tenant to a new system from its original system, for example in an operation that copies the tenant from the original system to the new system, the tenant on the original system can remain available after the transfer, and the second part of the test can be executed on the tenant in the original system as well. In this manner, negative results can be analyzed more quickly. If the second part of a test does not run successfully in either the original system or the new system, the error cause can be determined to likely arise from problems in the business application and not from the system operation.

Before the second part (the system operation) is started, the status and the context information from the execution of the test can be stored to a scenario state database. As shown in the diagram 400 of FIG. 4, a test script 402 that runs in the tenant in its first system state 404 can include both the first part 406 and the second part 410 of the test script 402. In the example shown in FIG. 4, the test script 402 includes five run processes numbered 1 through 5. When process #3 has finished successfully, the complete context of the test framework can be written to a scenario state database 412, for example to include variables and runtime objects that are possibly needed in later processes.

Execution of the test script 402 can be stopped on the tenant in the first system state 404 at this point, and the transition from the first system state 404 to the second system state 414 can be initiated. The transition can, as noted above, include moving of the tenant from an original system to a new system, copying of the tenant from the original system to the new system, copying of the tenant to the original system (for example to create duplicate tenants on the first system for testing, scoping, etc.), a system software change or update on the original system, or other operations that can affect whether the tenant can properly perform existing or in-progress business processes or scenarios. In a moving or copying operation or other operation related to multi-tenancy, the test context related to the tenant-specific data stored in the content database 114 of the multitenant architecture 100 can be copied, moved, or the like with the normal application tables. The context data 202 that is written when a script execution is stopped can be part of the tenant content 206.

Figure 4:
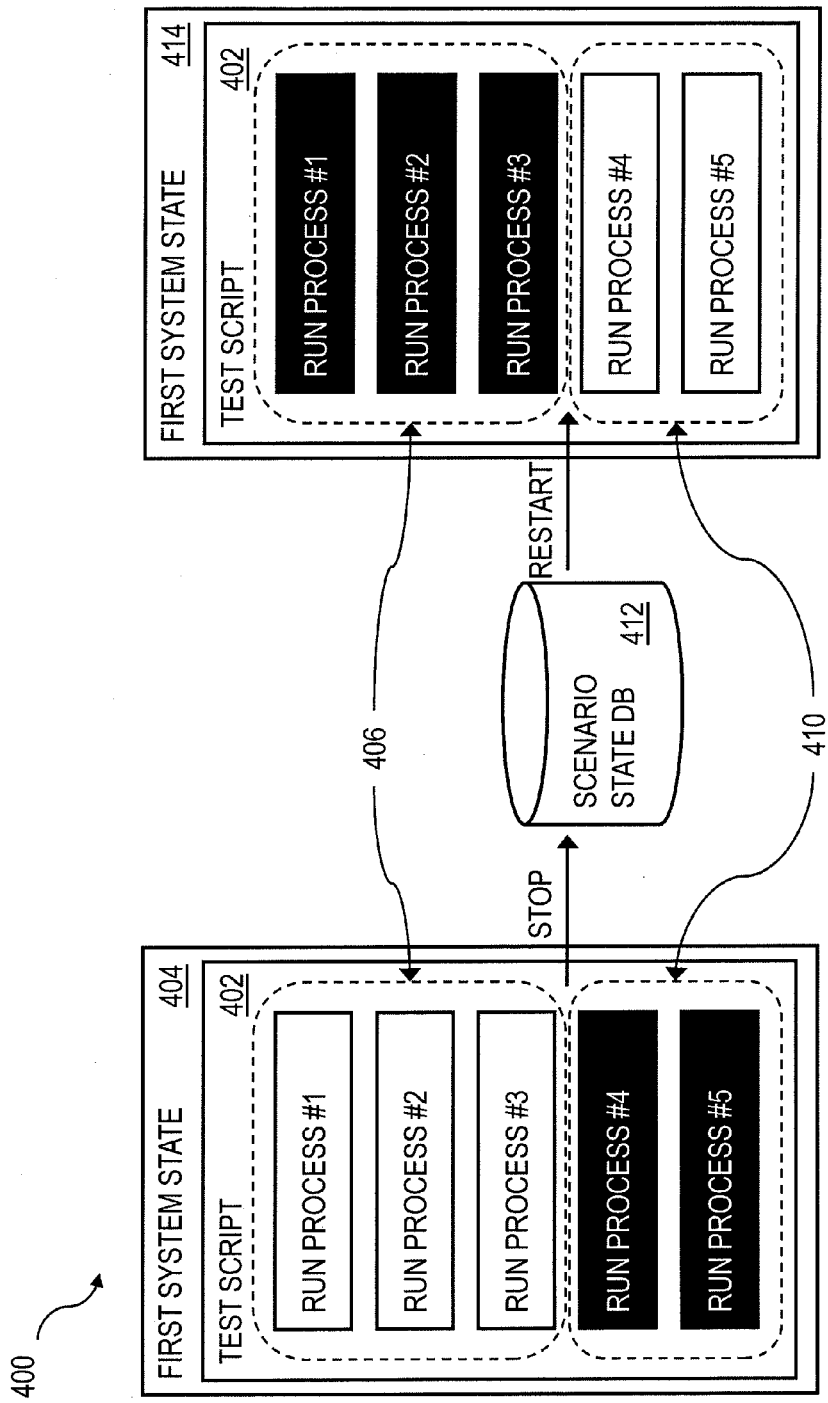
FIG. 4 is a diagram illustrating an example of a test script start and stop process.

When the transition is finished, the second part 410 of the test script 402 can be executed. To do so, the existing context stored at the end of the execution of the first part 406 of the test script 402 can be read from the scenario state database 412. The test framework can at this point exist in a state as if the first part 406 of the test script 402 had been called directly in the same run. As shown in the example of FIG. 4, the second part 410 of the test script 402 can contain two processes, #4 and #5 that are invoked in the context of the first part 406 of the test script 402 just as through the tenant were still operating in the first system state 404. From the perspective of process #4 and #5, the test script 402 was never interrupted.

Figure 5:
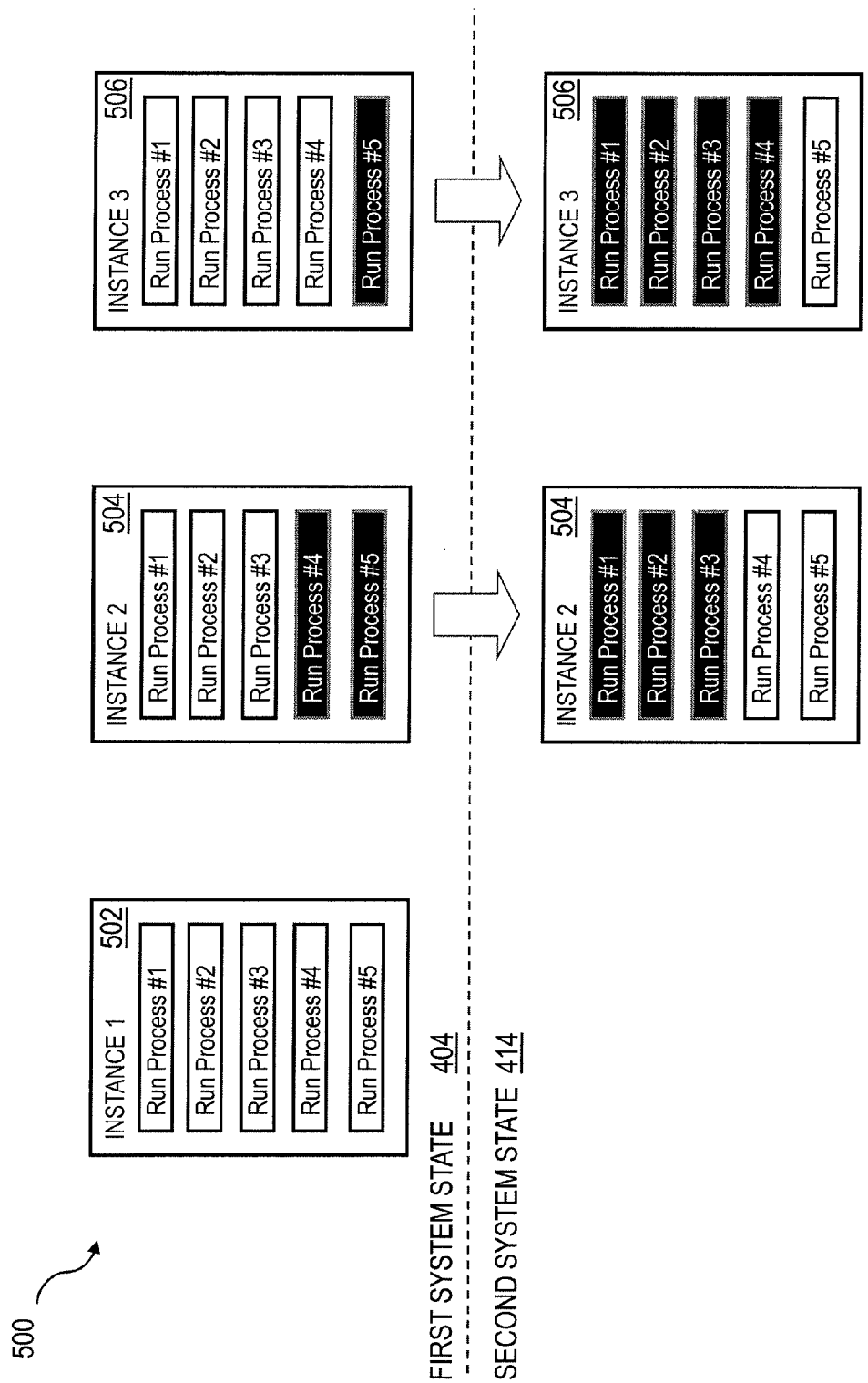
FIG. 5 is a diagram illustrating an example of re-use of a test script for testing interruption at different parts of the test script.

The information about the position where the test script 402 is to be interrupted can be an execution parameter and need not be an attribute of the test script itself. This parameter can be passed together with the test name and logging options to the test framework to start the test. This approach can provide several advantages. Different instances of the same test script 402 can be interrupted at different positions as shown in the diagram 500 of FIG. 5. A first instance 502 can be run entirely in the first system state 404 of the tenant to verify that full completion of the test script 402 is possible in the tenant as it exists in its first system state. A second instance 504 of the test script 402 can be run as previously shown in FIG. 4 according to an execution parameter such that a stop occurs after completion of process #3. A third instance 506 of the test script 402 can be run according to a different execution parameter such that a stop occurs after completion of process #4.

Using a separate execution parameter, an existing test script can be re-used for additional test cases without requiring changes to the test script itself. If the execution parameter is not set, the test script 402 can be executed completely without any interruption as with the first instance 502 of the test script in FIG. 5. The execution parameter can therefore provide a way to verify whether the test has run successfully.

According to the above description of the test concept, the complete business data must be stored before the test is interrupted. The author of the test script 402 can include a save statement to write current transactional data of the tenant to its corresponding tables in the content database 114 of the multitenant architecture 100. Between the save statement and the actual interruption of the script execution there should be no operation that creates or changes business data. Otherwise, such data will be lost during the interruption. This limitation may not need to be applied to context data such as containers and values that can be created and changed before the interruption without needing an explicit save statement. Additionally, statements like assertions can be executed without any limitations as such statements generally do not create any business data.

Figure 6:
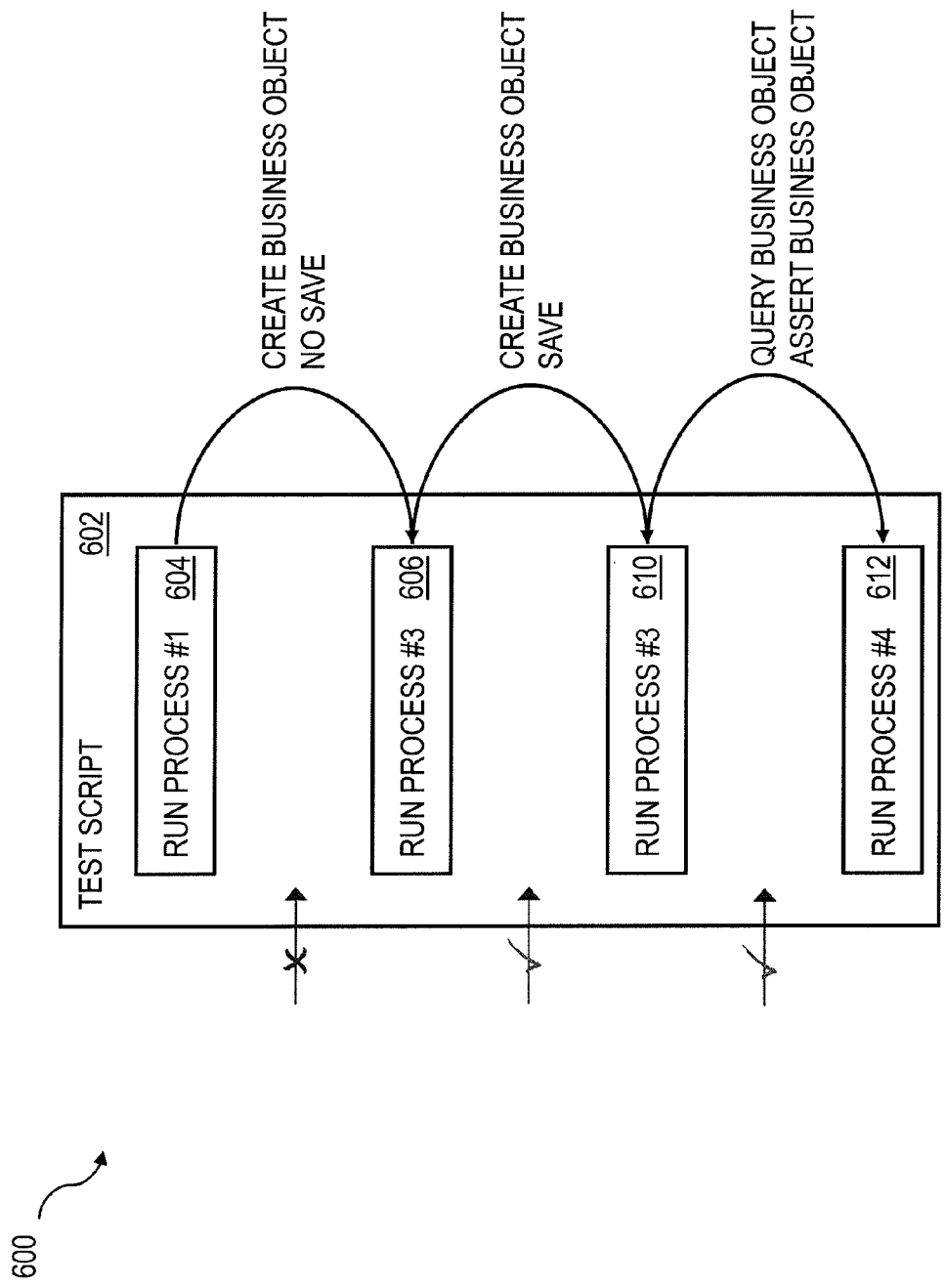
FIG. 6 is a diagram illustrating an example availability of different positions at which a test script can be stop and restarted.

FIG. 6 shows a diagram 600 illustrating three possible positions where a test script 602 including four processes can conceivably be interrupted. However, only the second and third possible interruption points can provide valid results. In process #1 604 of the test script 602, transactional data are created, but not saved. Thus, these transactional data would be lost if the execution of the test script 602 were interrupted at this position. In process #2 606, a save is called, which persists the transactional data from process #1 604 and #2 606. After this process, an interruption can occur without data loss. In process #3 606, a read-only access to the already saved data occurs. Here again, an interruption would be valid as a read-only process does not affect previously saved values.

For domain specific script languages with a predefined set of statements, the possible positions where a script can be interrupted can be determined automatically with the rules described above. If this automatic approach finds too many possible positions, a semi-automatic approach can be chosen. The system can present a list of possible positions and the test developer can select all positions where an interruption makes sense from a business point of view.

When the execution of a test is interrupted, the context can be written to the scenario state database 412. As already mentioned, the context can thus be restored after the transition from the first system state to the second system state, and the test script can be continued with the next process.

Figure 7:
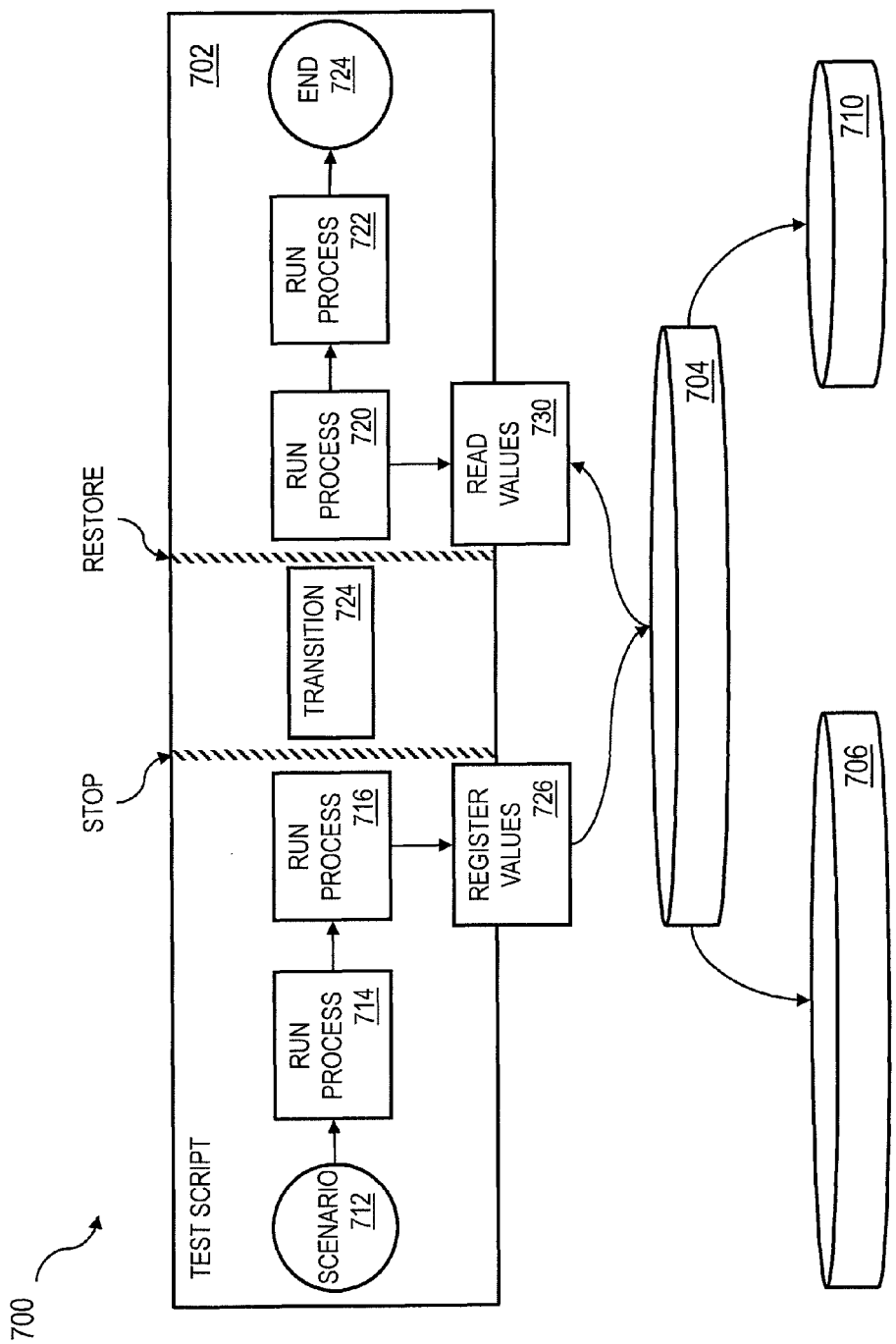
FIG. 7 is a diagram illustrating an example of stopping and restarting a test script at different run processes.

In some implementations, such as for example that illustrated in the diagram 700 of FIG. 7, each interrupted instance of a test script 702 can create an entry in a stop-run table 704 including the position where it was stopped as part of the table key. In this manner, the same test script can be stopped and restarted at different positions. Additionally, the stop-run table 704 can be the header table for one or more other tables storing the actual execution context. A first additional table 706 can save serialized runtime objects that are deserialized again when the test script is restarted. A second additional table 710 can keep track of the variables in the test.

For example, viability of a business scenario or business process 712 that includes four run processes 714, 716, 720, 722 can be tested using the test script 702. In the instance shown in FIG. 7, the test script is interrupted after the second run process 716 so that the transition 724 can occur such that the tenant transitions between a first system state and a second system state. At the stop point, after the second process, any values of data, etc. generated by the test script as of the stop point can be registered 726 to the stop-run table 704. After the transition 724, these data values, etc. are read 730 from the sto-run table 704 for use in the resumption of the test script 702 with the third process 720.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a machine-readable medium storing instructions that, when executed by at least one programmable processor, cause the at least one programmable processor to perform operations comprising:

executing a first part of a test script in a tenant currently having a first system state, the test script comprising the first part and a second part, the first part comprising one or more first processes of a business process or scenario, the secondpart comprising one or more second processes of the business process or scenario;

stopping execution of the test script on the tenant in the first system state at a stop point, the stop point occurring at an end of the first part;

storing context data at the end of the first part of the test script, the context data comprising at least some tenant content, the tenant content comprising at least one of data objects and extensions to other data objects that are customized for the tenant to reflect business processes and data that are specific to the tenant and are accessible only to authorized users at the tenant;

transitioning the tenant from the first system state to a second system state, the transitioning having an unknown effect on the business process or business scenario running in the tenant;

executing the second part of the test script in the tenant while the tenant is in the second system state, the executing of the second part comprising reading the context data stored at the end of the first part of the test script and invoking the one or more second processes using the read context data such that execution of the test script proceeds as through the tenant were still operating in the first system state and the test script had not been interrupted; and determining, upon completion of the test script, whether the transition of the tenant from the first system state to the second system state negatively impacts the running of the business process or business scenario for the tenant.

2. A computer program product as in claim 1, wherein the transition comprises at least one of a change, update, or modification to a system upon which the tenant is hosted.

3. A computer program product as in claim 2, wherein the first system state comprises the system prior to the transition and the second system comprises the system subsequent to the transition.

4. A computer program product as in claim 1, wherein the transition comprises a moving of the tenant from a first system upon which the tenant is hosted to a second system or a copying of the tenant to create a tenant copy hosted on the first system or on the second system, the first system state comprising a first operating environment on the first system and the second system state comprising a second operating environment on the second system.

5. A computer program product as in claim 1, wherein the tenant is one of a plurality of tenants hosted in a multi-tenant system that comprises an application server and a data repository, the application server providing access for each of a plurality of organizations to one of the plurality of tenants.

6. A computer program product as in claim 5, wherein each of the plurality of client tenants comprises a customizable, organization-specific version of a core software platform, and the data repository comprises tenant-independent content that is common to all of the plurality of client tenants and tenant-specific content items whose tenant-specific content formats and tenant-specific content data are defined by and available to only one of the plurality of client tenants.

7. A computer program product as in claim 1, wherein the operations further comprise determining the stop point based on an execution parameter received at a start of the test, the execution parameter being variable such that a second test of the tenant in the first system state and the second system state comprises either the first part including at least one of the one or more second processes or the second part including at least one of the one or more first processes.

8. A system comprising
at least one processor; and
at least one machine-readable medium storing instructions that, when executed by the at least one programmable processor, cause the at least one programmable processor to perform operations comprising:

executing a first part of a test script in a tenant currently having a first system state the test script comprising the first part and a second part, the first part comprising one or more first processes of a business process or scenario, the second part comprising one or more second processes of the business process or scenario;

stopping execution of the test script on the tenant in the first system state at a stop point, the stop point occurring at an end of the first part;

storing context data at the end of the first part of the test script, the context data comprising at least some tenant content, the tenant content comprising at least one of data objects and extensions to other data objects that are customized for the tenant to reflect business processes and data that are specific to the tenant and are accessible only to authorized users at the tenant;

transitioning the tenant from the first system state to a second system state, the transitioning having an unknown effect on the business process or business scenario running in the tenant;

executing the second part of the test script in the tenant while the tenant is in the second system state, the executing of the second part comprising reading the context data stored at the end of the first part of the test script and invoking the one or more second processes using the read context data such that execution of the test script proceeds as through the tenant were still operating in the first system state and the test script had not been interrupted; and determining, upon completion of the test script, whether the transition of the tenant from the first system state to the second system state negatively impacts the running of the business process or business scenario for the tenant.

9. A system as in claim 8, wherein the transition comprises at least one of a change, update, or modification to a system upon which the tenant is hosted.

10. A system as in claim 9, wherein the first system state comprises the system prior to the transition and the second system comprises the system subsequent to the transition.

11. A system as in claim 9, wherein the transition comprises a moving of the tenant from a first system upon which the tenant is hosted to a second system or a copying of the tenant to create a tenant copy hosted on the first system or on the second system, the first system state comprising a first operating environment on the first system and the second system state comprising a second operating environment on the second system.

12. A system as in claim 9, wherein the tenant is one of a plurality of tenants hosted in a multi-tenant system that comprises an application server and a data repository, the application server providing access for each of a plurality of organizations to one of the plurality of tenants.

13. A system as in claim 12, wherein each of the plurality of client tenants comprises a customizable, organization-specific version of a core software platform, and the data repository comprises tenant-independent content that is common to all of the plurality of client tenants and tenant-specific content items whose tenant-specific content formats and tenant-specific content data are defined by and available to only one of the plurality of client tenants.

14. A method comprising;
executing a first part of a test script in a tenant currently having a first system state, the test script comprising the first part and a second part, the first part comprising one or more first processes of a business process or scenario, the second part comprising one or more second processes of the business process or scenario;

stopping execution of the test script on the tenant in the first system state at a stop point, the stop point occurring at an end of the first part;

storing context data at the end of the first part of the test script, the context data comprising at least some tenant content, the tenant content comprising at least one of data objects and extensions to other data objects that are customized for the tenant to reflect business processes and data that are specific to the tenant and are accessible only to authorized users at the tenant;

transitioning the tenant from the first system state to a second system state, the transitioning having an unknown effect on the business process or business scenario running in the tenant;

executing the second part of the test script in the tenant while the tenant is in the second system state, the executing of the second part comprising reading the context data stored at the end of the first part of the test script and invoking the one or more second processes using the read context data such that execution of the test script proceeds as through the tenant were still operating in the first system state and the test script had not been interrupted; and determining, upon completion of the test script, whether the transition of the tenant from the first system state to the second system state negatively impacts the running of the business process or business scenario for the tenant.

15. A method as in claim 14, wherein the transition comprises at least one of a change, update, or modification to a system upon which the tenant is hosted.

16. A method as in claim 15, wherein the first system state comprises the system prior to the transition and the second system comprises the system subsequent to the transition.

17. A method as in claim 14, wherein the transition comprises a moving of the tenant from a first system upon which the tenant is hosted to a second system or a copying of the tenant to create a tenant copy hosted on the first system or on the second system, the first system state comprising a first operating environment on the first system and the second system state comprising a second operating environment on the second system.

18. A method as in claim 14, wherein the tenant is one of a plurality of tenants hosted in a multi-tenant system that comprises an application server and a data repository, the application server providing access for each of a plurality of organizations to one of the plurality of tenants.

19. A method as in claim 18, wherein each of the plurality of client tenants comprises a customizable, organization-specific version of a core software platform, and the data repository comprises tenant-independent content that is common to all of the plurality of client tenants and tenant-specific content items whose tenant-specific content formats and tenant-specific content data are defined by and available to only one of the plurality of client tenants.

20. A computer program product as in claim 19, wherein the operations further comprise automatically determining the stop point based on a set of rules, the set of rules comprising not allowing the stop point to occur after any process in the test script in which transactional data are created but not saved, allowing the stop point to occur after any process in the test script in which a save is called to persist transactional data, and allowing the stop point to occur after any read-only process in the test script.

* * * * *